US011794780B2

(12) United States Patent
Reshef

(10) Patent No.: US 11,794,780 B2
(45) Date of Patent: Oct. 24, 2023

(54) REWARD FUNCTION FOR VEHICLES

(71) Applicant: GM Global Technology Operations LLC, Detroit, MI (US)

(72) Inventor: Roi Reshef, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 139 days.

(21) Appl. No.: 17/388,509

(22) Filed: Jul. 29, 2021

(65) Prior Publication Data

US 2023/0035281 A1    Feb. 2, 2023

(51) Int. Cl.
*B60W 60/00* (2020.01)
*B60W 40/09* (2012.01)
*H04W 4/40* (2018.01)
*G06N 3/08* (2023.01)
*B60W 40/08* (2012.01)

(52) U.S. Cl.
CPC ........ *B60W 60/0013* (2020.02); *B60W 40/09* (2013.01); *G06N 3/08* (2013.01); *H04W 4/40* (2018.02); *B60W 2040/0827* (2013.01); *B60W 2040/0872* (2013.01); *B60W 2540/229* (2020.02)

(58) Field of Classification Search
CPC .. B60W 60/00; B60W 40/00; B60W 2540/00; G06N 3/00; H04W 4/00
See application file for complete search history.

(56) References Cited

U.S. PATENT DOCUMENTS

| | | | | |
|---|---|---|---|---|
| 2018/0293498 | A1* | 10/2018 | Campos | G06F 9/451 |
| 2019/0291728 | A1* | 9/2019 | Shalev-Shwartz | B60W 30/165 |
| 2019/0377354 | A1* | 12/2019 | Shalev-Shwartz | G06F 18/29 |
| 2020/0088539 | A1* | 3/2020 | Shashua | G01C 21/3602 |
| 2020/0192359 | A1* | 6/2020 | Aragon | B60W 60/0053 |
| 2020/0192393 | A1* | 6/2020 | Aragon | G06N 5/01 |
| 2021/0080955 | A1* | 3/2021 | Wilkinson | G05D 1/0214 |
| 2021/0271245 | A1* | 9/2021 | Bradley | G05D 1/0088 |
| 2021/0339777 | A1* | 11/2021 | Kataoka | G08G 1/20 |
| 2021/0373566 | A1* | 12/2021 | Agarwal | G05D 1/0223 |
| 2022/0063651 | A1* | 3/2022 | Dai | B60W 10/20 |
| 2022/0371612 | A1* | 11/2022 | Wray | B60W 50/14 |

OTHER PUBLICATIONS

Hoel et al.; "Combining Planning and Deep Reinforcement Learning in Tactical Decision Making for Autonomous Driving"; Retrieved Online from arXiv:1905.02680v1 [cs.RO]; May 6, 2019; 12 Pages.

* cited by examiner

*Primary Examiner* — Aniss Chad
*Assistant Examiner* — Elizabeth J Slowik
(74) *Attorney, Agent, or Firm* — CANTOR COLBURN LLP

(57) ABSTRACT

Examples described herein provide a computer-implemented method that includes receiving, by a processing device, a current state of a vehicle. The method further includes predicting, by the processing device using an output of an artificial intelligence model, a future state of the vehicle based at least in part on the current state of the vehicle. The method further includes calculating, by the processing device using a tunable reward function, a reward associated with the future state of the vehicle, the tunable reward function comprising multiple tunable coefficients. The method further includes training, by the processing device, the artificial intelligence model based at least in part on the reward.

11 Claims, 4 Drawing Sheets

REWARD FUNCTION FOR VEHICLES

INTRODUCTION

The present disclosure relates to vehicles and more particularly to a reward function for vehicles.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information from the vehicle to any other suitable entity. Various applications (e.g., V2X applications) can use V2X communications to send and/or receive safety messages, maintenance messages, vehicle status messages, and the like.

Modern vehicles can also include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors such as a radar device(s), LiDAR device(s), and/or the like for performing target tracking. Target tracking includes identifying a target object and tracking the target object over time as the target object moves with respect to the vehicle observing the target object. Images from the one or more cameras of the vehicle can also be used for performing target tracking.

These communication protocols, cameras, and/or sensors can be useful for autonomous vehicle operation.

SUMMARY

In one exemplary embodiment, a computer-implemented method is provided. The method includes receiving, by a processing device, a current state of a vehicle. The method further includes predicting, by the processing device using an output of an artificial intelligence model, a future state of the vehicle based at least in part on the current state of the vehicle. The method further includes calculating, by the processing device using a tunable reward function, a reward associated with the future state of the vehicle, the tunable reward function comprising multiple tunable coefficients. The method further includes training, by the processing device, the artificial intelligence model based at least in part on the reward.

In additional examples, one of the multiple tunable coefficients is a tunable coefficient of a magnitude of a velocity of the vehicle from a desired driving velocity.

In additional examples, one of the multiple tunable coefficients is a tunable coefficient of a decay of a velocity of the vehicle from a desired driving velocity.

In additional examples, one of the multiple tunable coefficients is a tunable coefficient of a magnitude of jerk caused by a change in a velocity of the vehicle.

In additional examples, one of the multiple tunable coefficients is a tunable discount factor.

In additional examples, one of the multiple tunable coefficients is a tunable coefficient of magnitude of success for a handoff.

In additional examples, the tunable reward function rewards for both a full success and a partial success.

In additional examples, the tunable reward function accounts for a current reward versus a future reward.

In additional examples, the tunable reward function rewards for efficiency.

In additional examples, the tunable reward function rewards for comfort.

In additional examples, the tunable reward function considers a tradeoff between efficiency and comfort.

In additional examples, the tunable reward function is a function of the current state s of the vehicle, an action a, and the future state s' of the vehicle.

In additional examples, the tunable reward function is expressed as:

$$R(s, a, s') = +1 - C_{speed}\left[\frac{|v_h - v_{desired}|}{v_{desired}}\right]^{C_{temp}} - C_{Jerk}\int J^2(t) + \frac{1}{1-\gamma} \cdot [I_{success}(s') + C_{handoff} \cdot I_{handoff}(s')].$$

where $C_{speed}$ is a tunable coefficient of velocity; $v_h$ is an actual velocity of the vehicle; $v_{desired}$ is a desired driving velocity of the vehicle; $C_{temp}$ is a tunable coefficient of a decay of a velocity of the vehicle from the desired driving velocity; $C_{Jerk}$ is a tunable coefficient of a magnitude of jerk; $J^2$ is a squared amount of jerk; $\gamma$ is a tunable discount factor; I is an indicator function; and $C_{handoff}$ is a tunable coefficient of magnitude of success for a handoff.

In additional examples, the method further includes: controlling the vehicle based at least in part on the artificial intelligence model.

In additional examples, the tunable reward function supports driver-in-the-loop functionality.

In another exemplary embodiment a system includes a memory having computer readable instructions. The system further includes a processing device for executing the computer readable instructions, the computer readable instructions controlling the processing device to perform operations. The operations include receiving a current state of a vehicle. The operations further include predicting, using an output of an artificial intelligence model, a future state of the vehicle based at least in part on the current state of the vehicle. The operations further include calculating, using a tunable reward function, a reward associated with the future state of the vehicle, the tunable reward function comprising multiple tunable coefficients. The operations further include training the artificial intelligence model based at least in part on the reward.

In additional examples, the tunable reward function is a function of the current state s of the vehicle, an action a, and the future state s' of the vehicle.

In additional examples, the tunable reward function is expressed as:

$$R(s, a, s') = +1 - C_{speed}\left[\frac{|v_h - v_{desired}|}{v_{desired}}\right]^{C_{temp}} -$$

$$C_{Jerk}\int J^2(t) + \frac{1}{1-\gamma} \cdot [I_{success}(s') + C_{handoff} \cdot I_{handoff}(s')].$$

where $C_{speed}$ is a tunable coefficient of velocity; $v_h$ is an actual velocity of the vehicle; $v_{desired}$ is a desired driving velocity of the vehicle; $C_{temp}$ is a tunable coefficient of a decay of a velocity of the vehicle from the desired driving velocity; $C_{Jerk}$ is a tunable coefficient of a magnitude of jerk; $J^2$ is a squared amount of jerk; $\gamma$ is a tunable discount factor; I is an indicator function; and $C_{handoff}$ is a tunable coefficient of magnitude of success for a handoff.

In additional examples, the operations further include: controlling the vehicle based at least in part on the artificial intelligence model.

In yet another exemplary embodiment a computer readable storage medium having program instructions embodied therewith is provided, the program instructions executable by a processor to cause the processor to perform operations. The operations include receiving a current state of a vehicle. The operations further include predicting, using an output of an artificial intelligence model, a future state of the vehicle based at least in part on the current state of the vehicle. The operations further include calculating, using a tunable reward function, a reward associated with the future state of the vehicle, the tunable reward function comprising multiple tunable coefficients. The operations further include training the artificial intelligence model based at least in part on the reward.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
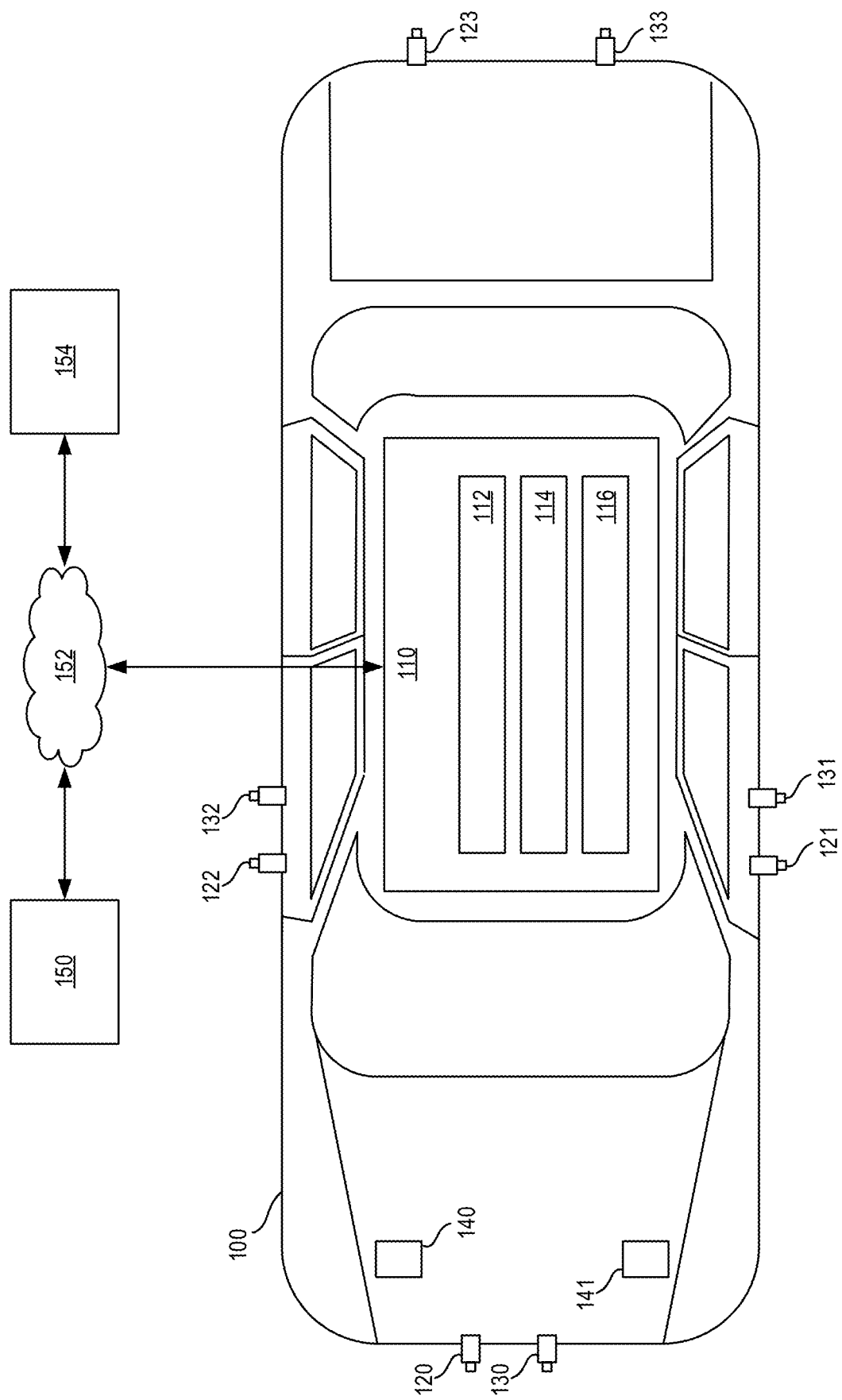
FIG. 1 depicts a vehicle including sensors and a processing system according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide a tunable reward function for autonomous vehicle (AV) operation. Particularly, one or more embodiments described herein provide a robust and comprehensive design for a reward (or "cost") function for autonomous driving applications with driver-in-the-loop. "Driver-in-the-loop" refers to the ability of a driver (e.g., an operator of the vehicle) to take control of the autonomous vehicle. The driver taking control of the AV can occur by the driver intentionally taking over control or the AV handing control to the driver (e.g., the AV understands it can no longer control the vehicle well).

Autonomous driving agents, which control autonomous vehicles, need to evaluate different maneuvers consistently and to plan towards a safe, comfortable, and efficient ride. To do that, various planning approaches optimize motion plans by evaluating potential maneuvers based on criteria of interest so that a maximal reward (or minimal cost) plan can be found/approximated. One or more embodiments described herein provide a comprehensive and universal reward function design that accounts for driver-in-the-loop criteria and can be used by various optimization algorithms to generate suitable AV driving policies for autonomous driving. AV driving policies provide for how an autonomous vehicle operates. AV driving policies encode and extract information about an autonomous vehicle's environment relative to decision making. This information is used to construct a behavioral/motion plan for the autonomous vehicle to execute. The information can be collected from the autonomous vehicle (referred to as the "target vehicle") and/or from other surrounding vehicles (which may or may not be autonomous also) (referred to as "another vehicle" or "other vehicles").

One or more embodiments described herein address these and other shortcomings of the prior art by providing a reward function that reflects the desired behavior of an AV agents including criteria of efficiency, comfort, and task-completion. Tradeoffs among these three criteria can be tuned/personalized. Further, one or more embodiments described herein support driver-in-the-loop systems that reward driver "handoff" by augmenting the reward function with partial task-completion rewards. One or more embodiments described herein provide for a design and tuning methodology for a reward function used to optimize autonomous driving plans, suitable for driver-in-the-loop applications, that can be used by any utility-based approach, such as online-search or learning methods (e.g., reinforcement learning) to generate optimized driving plans.

FIG. 1 depicts a vehicle 100 including sensors and a processing system 110 according to one or more embodiments described herein. In the example of FIG. 1, the vehicle 100 includes the processing system 110, cameras 120, 121, 122, 123, cameras 130, 131, 132, 133, a radar sensor 140, and a LiDAR sensor 141. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). The cameras 130-133 are long-range cameras that capture images external to the vehicle and farther away from the vehicle 100 than the cameras 120-123. These images can be useful for object detection and avoidance, for example. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The radar sensor 140 measures range to a target object by transmitting electromagnetic waves and measuring the reflected waves with a sensor. This information is useful for determining a target object's distance/location relative to the vehicle 100.

The LiDAR (light detection and ranging) sensor 141 measures distance to a target object (e.g., other vehicle 154) by illuminating the target with pulsed laser light and measuring the reflected pulses with a sensor. This information is useful for determining a target object's distance/location relative to the vehicle 100.

Data generated from the cameras 120-123, 130-133, the radar sensor 140, and/or the LiDAR sensor 141 can be used to detect and/or track a target object relative to the vehicle 100. Examples of target objects include other vehicles (e.g., the other vehicle 154), vulnerable road users (VRUs) such as pedestrians, bicycles, animals, potholes, oil on a roadway surface, debris on a roadway surface, fog, flooding, and the like.

The processing system 110 can be communicatively coupled to a remote processing system 150, which can be an edge processing node as part of an edge processing environment, a cloud processing node as part of a cloud processing environment, or the like. The processing system 110 can also be communicatively coupled to one or more other vehicles (e.g., other vehicle 154). In some examples, the processing system 110 is communicatively coupled to the processing system 150 and/or the other vehicle 154 directly (e.g., using V2V communication), while in other examples, the processing system 110 is communicatively coupled to the processing system 150 and/or the other vehicle 154 indirectly, such as by a network. For example, the processing system 110 can include a network adapter (not shown) (see, e.g., the network adapter 426 of FIG. 4). The network adapter enables the processing system 110 to transmit data to and/or receive data from other sources, such as other processing systems, data repositories, and the like including the remote processing system 150 and the other vehicle 154. As an example, the processing system 110 can transmit data to and/or receive data from the remote processing system 150 directly and/or via a network 152.

The network 152 represents any one or a combination of different types of suitable communications networks such as, for example, cable networks, public networks (e.g., the Internet), private networks, wireless networks, cellular networks, or any other suitable private and/or public networks. Further, the network 152 can have any suitable communication range associated therewith and may include, for example, global networks (e.g., the Internet), metropolitan area networks (MANs), wide area networks (WANs), local area networks (LANs), or personal area networks (PANs). In addition, the network 152 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

According to one or more embodiments described herein, the remote processing system 150, the other vehicle 154, and the processing system 110 communicate via a vehicle-to-infrastructure (V2I), vehicle-to-vehicle (V2V), vehicle-to-pedestrian (V2P), and/or vehicle-to-grid (V2G) communication.

The features and functionality of the components of the processing system 110 are described further herein. The processing system 110 of the vehicle 100 aids in decision making in the context of autonomous vehicle operation, which may include using a reward function as described herein. Particularly, the processing system 110 includes a data/communication engine 112, an autonomous agent engine 114, and a control engine 116. The data/communication engine 112 receives/collects data, such as data from sensors associated with the vehicle 100, and/or receives data from other sources such as the remote processing system 150 and/or the other vehicle 154. The autonomous agent engine 114 serves as an intelligent agent that performs operations with at least some degree of autonomy. For example, the autonomous agent engine 114 autonomously operates the vehicle 100 to achieve a goal. The goal could be to navigate from location A to location B. The autonomous agent engine 114 can utilize machine learning functionality to accomplish the goal, which is described further herein. The control engine 116 controls the vehicle 100, such as to execute a driving maneuver (e.g., change lanes, change velocity, etc.). Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.), input and/or output devices (e.g., a display, a touchpad, a microphone, speakers, etc.) and the like.

Aspects of the present disclosure can utilize machine learning functionality to accomplish the various operations described herein. More specifically, one or more embodiments described herein can incorporate and utilize rule-based decision making and artificial intelligent (AI) reasoning to accomplish the various operations described herein. The phrase "machine learning" broadly describes a function of electronic systems that learn from data. A machine learning system, module, or engine (e.g., the autonomous agent engine 114) can include a trainable machine learning algorithm that can be trained, such as in an external cloud environment, to learn functional relationships between inputs and outputs that are currently unknown, and the resulting model can be used to determine surrogate computer program usage. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

One type of machine learning is reinforcement learning, which deals with how agents (e.g., the autonomous agent engine 114) take actions to achieve a desired goal while maximizing a reward. Reinforced learning uses data in the form of state-action pairs with the goal of maximizing future rewards over many time steps. In reinforced learning, an agent (e.g., the autonomous agent engine 114) is said to be at a state s, which is a situation which the agent perceives. The agent takes an action $a_t$, which is a move the agent can make in an environment at time t. The environment sends back an observation to the agent after taking the action $a_t$ in the form of a state change $s_{t+1}$ at a time t+1. The agent also receives a reward $r_t$ that is feedback measuring the success or failure of the agent's action $a_t$ at time t. Reinforced learning is useful for decision making in the context of autonomous vehicle operation.

One or more embodiments described herein provide a design and tuning-methodology for a reward function used to optimize autonomous driving plans generated using reinforcement learning. The proposed tunable reward function is suitable for driver in the loop applications and can be used by any utility-based approach, such as online-search or learning methods such as reinforcement learning, to generate optimized driving plans.

A driving policy can be considered acceptable when three success criteria are met, namely task completion, efficiency, and comfort/consistency. The task completion criterium is often reflected as arrival to some desired destination/condition. The efficiency criterium is achieving task completion in the fastest possible way, within some environmental limits. The comfort/consistency criterium is based on decisiveness and execution of smooth and comfortable sequences of maneuvers on the way to achieving its goal. In order to achieve these three criteria, the following tunable reward function is proposed:

$$R(s, a, s') = +1 - C_{speed}\left[\frac{|v_h - v_{desired}|}{v_{desired}}\right]^{C_{temp}} -$$

$$C_{Jerk}\int J^2(t) + \frac{1}{1-\gamma} \cdot [I_{success}(s') + C_{handoff} \cdot I_{handoff}(s')].$$

where $C_{speed}$ is a tunable coefficient of velocity; $v_h$ is the actual velocity of the vehicle; $v_{desired}$ is the desired driving velocity of the vehicle; $C_{temp}$ is a tunable coefficient of a decay of a velocity of the vehicle from the desired driving velocity; $C_{Jerk}$ is a tunable coefficient of magnitude of jerk, which is the derivative of (or momentary change in) acceleration, which is the derivative of the actual velocity of the vehicle; $J^2$ is the squared amount of jerk, which is the momentary change in acceleration; $\gamma$ is a tunable discount factor; I is an indicator function (e.g., it returns 0 when its predicate is false and 1 when true) with a predicate (condition) that is defined by the user and can be scenario-specific, with $I_{success}$ corresponding to a success condition and $I_{handoff}$ corresponding to a handoff event; and $C_{handoff}$ is a tunable coefficient of magnitude of a handoff event.

The tunable reward function is a function of a state of the environment s, an action a, and a future state of the environment s'. The first term is a "keep alive" dense reward (at every step), meant mostly for normalization. The second term is a speed-deviation penalty term parameterized by a multiplier and a temperature coefficient. The third term is an integral over the squared jerk (and/or any of its derivatives or artifacts) of the motion. The fourth and fifth terms are task-completion terms, rewarding for full and partial (handoff) success. It should be appreciated that the following components of the reward function are tunable: $C_{speed}$, $C_{temp}$, $C_{Jerk}$, $\gamma$, and $C_{handoff}$.

The tunable reward function rewards for both full and partial successes. It is assumed that under some plans the autonomous agent (e.g., the autonomous agent engine 114) may fail to achieve its goals. Such failure often incurs high cost with respect to the reward. To avoid that, the autonomous agent has a choice to "handoff" the driving controls to a human operator/driver (e.g., in driver-in-the-loop system, like L2/3 advanced driver-assistance system (ADAS)), or alternatively, the human operator/driver in charge may choose to proactively override the autonomous agent to avoid undesired situations. The tunable reward function includes indicators components to reward for either "full success" or "partial success," along with one or more partial-success components to represent a handoff result (triggered by either driver or agent). For example, the $C_{handoff}$ coefficient trades-off availability for risk of failure. That is, a higher availability will be a result of a low $C_{handoff}$ and a lower risk of failure will be a results of high $C_{handoff}$. An end user can define the logic behind the indicator functions for flexibility, which may be scenario-dependent.

The tunable reward function also considers when to reward: now or in the future. For example, in the planning domain, it is widely acceptable to design discounted reward functions using a discount factor $\gamma$. The tunable reward function takes the discount factor $\gamma$ and amplifies its effect by using it for normalization of the tunable reward function. An implicit assumption is that post-success future rewards will be maximal, such that the negative (2nd and 3rd reward terms) will be zero, and the non-zero dense rewards will include the +1 "keep-alive" term. Following this assumption, and under that same $\gamma$-discounted regime, the "task completion" terms (4th and 5th) are amplified by the $1/1-\gamma$ multiplier that reflects the sum of +1 geometric series over infinite future. With this, the same $\gamma$ parameter can be reused to control discounted future, and greediness versus long-term planning, which are highly related concepts of planning.

The tunable reward function also rewards for efficiency. The efficiency term (2nd term) measures deviation from some desired driving speed (e.g., the maximal speed limit, a feedback from a human driver, etc.). For simplicity (and without loss of generality), it can be assumed that driving speed is equal or less than the desired speed, resulting with a term in the range [0,1] that penalizes for deviation from desired speed. The magnitude and decay of that term are parameterized by coefficients $C_{speed}$ and $C_{temp}$ respectively. A preliminary tuning of those two coefficients is useful for reflecting the effect of driving at lower speeds.

The tunable reward function also rewards for comfort. It can be assumed that an autonomous agent tends to converge and stay at some arbitrary speed for most of its ride. Under such an assumption, any changes to driving speed apply either acceleration or deceleration at a short time window and converges back to zero. Therefore, to minimize excessive use of acceleration and deceleration, as well as changes to those (which are known to cause passenger discomfort), the tunable reward function penalizes for the sum of squared jerk component(s) of the motion plans under evaluation by the reward function using the $C_{Jerk}$ coefficient. Any other artifact of that minimization can be plugged into this term in addition (e.g., dealing with non-differential parts of the Jerk profile, etc.). Here, again, preliminary tuning can be performed for the inter-relations between the different comfort-related terms.

The tunable reward function also considers the tradeoff between efficiency and comfort. For example, the 2nd and 3rd terms of the reward function represent efficiency and comfort, respectively. This tradeoff can be controlled via weighing $C_{speed}$ versus $C_{Jerk}$.

Figure 2:
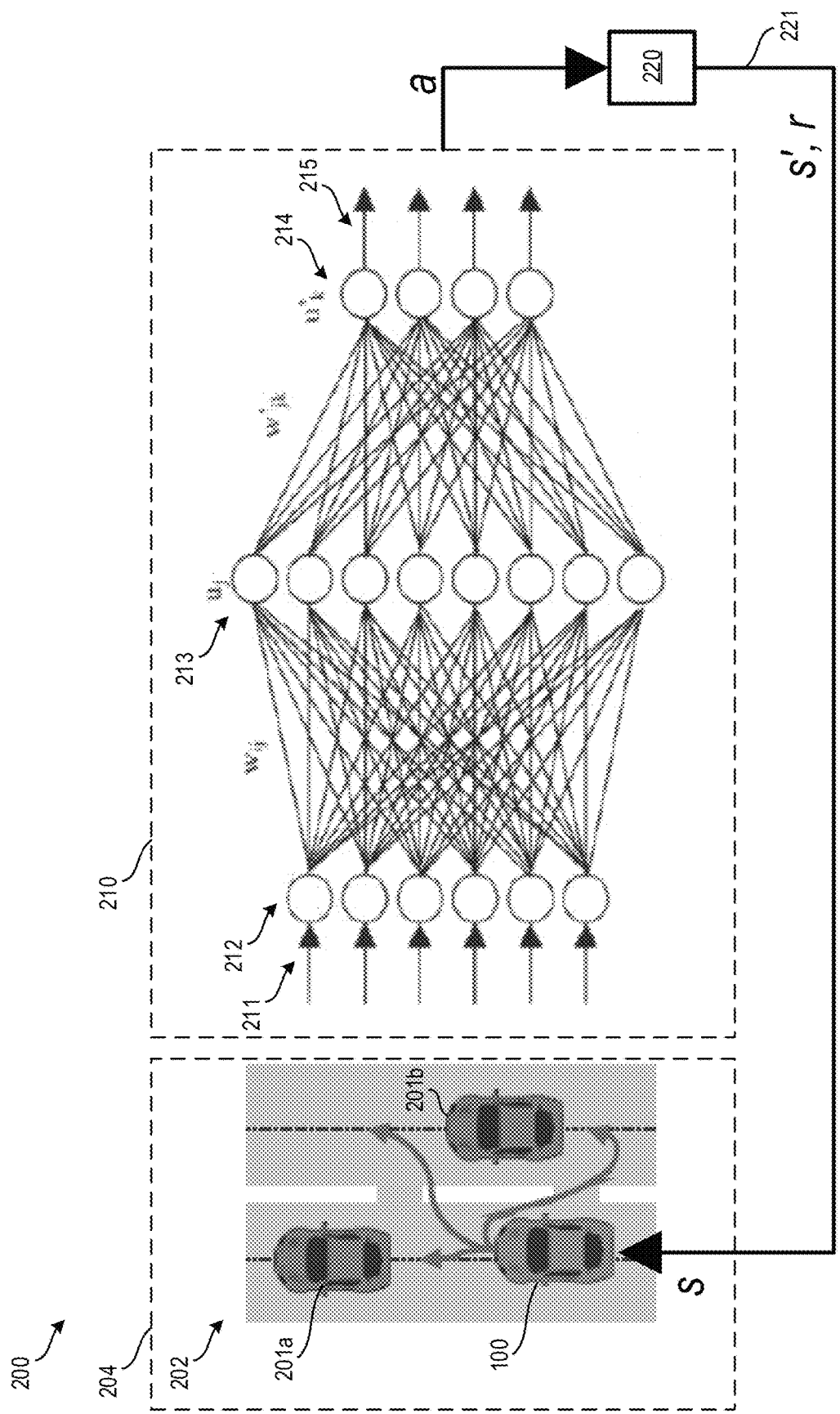
FIG. 2 depicts an architecture that supports autonomous vehicle operation using an artificial intelligence model and a tunable reward function according to one or more embodiments described herein.

FIG. 2 depicts an architecture 200 that supports training an autonomous agent (e.g., the autonomous agent engine 114) for autonomous vehicle operation using an artificial intelligence model 210 and a tunable reward function according to one or more embodiments described herein. In this example, logic 204 generates inputs 211 to an artificial intelligence model 210. Together, the logic 204 and the artificial intelligence model 210 form the autonomous agent engine 114. The architecture 200 uses the output 215 of the artificial intelligence model 210 (e.g., a reinforcement learning model, an online search model, etc.) to simulate actions for a vehicle 100 using a simulator 220.

For example, the vehicle 100 and vehicles 201a, 201b are traveling along a road 202. The vehicles 201a, 201b are examples of the other vehicle 154 of FIG. 1 and are collectively referred to as "vehicles 201." It should be appreciated one or more of the vehicles 201 can be configured similarly to the vehicle 100 as shown in FIG. 1 and as described herein or that each of the vehicles 201 can be configured differently than the vehicle 100 in some examples.

Each of the vehicles 100, 201 collects data about itself and transmits it to a processing system for processing (e.g., using the data/communication engine 112). According to an example, the vehicles 201 collect data about themselves and transmit the data to the processing system 110 of the vehicle 100 for processing by the autonomous agent 114. According to another example, the vehicles 100, 201 collect data about themselves and transmit the data to the remote processing system 150.

The data (i.e., information) provided by the vehicles 201 can indicate perception of the vehicles in the environment and may yield estimated kinematic states of the vehicles 201, lane assignments, a vehicle's intent (e.g., a direction of travel, an intention to merge/change lanes, etc.), and/or any other information useful for decision making.

The vehicle 100 has a current state s (also referred to as a "perceived state"). The autonomous agent engine 114 of the vehicle 100 evaluates possible actions, such as following behind the vehicle 201a, merging ahead of the vehicle 201b, and merging behind the vehicle 201b. To evaluate these possible actions, the autonomous agent engine 114 using the artificial intelligence model 210 as shown. The artificial intelligence model 210 takes as inputs 211 data about the vehicle 100, the vehicles 201a, 201b, and any other relevant data (e.g., data about the road 202, data about the surrounding environment, etc.). The artificial intelligence model 210 learns a policy π by evaluating the current state s, a plurality of actions $a_1 \ldots a_n$, and a future state s'. The artificial intelligence model 210 learns to rank/score the plurality of actions $a_1 \ldots a_n$ based on its estimation of their expected future rewards with respect to the tunable reward function. A de-facto sample from the tunable reward function is used to provide supervision for the above estimation and in that to determine which of the actions may be more desirable or less desirable than other actions, by taking into account future outcomes of actions. In this way, the artificial intelligence model 210 is trained. The artificial intelligence model 210 can rely on an input layer 212, a hidden layer 213 (which may be one or more hidden layers), and an output layer 214 that generates outputs 215 (e.g., the policy).

The simulator 220 receives the output from the autonomous agent engine 114 (represented by the logic 204 and the artificial intelligence model 210) in terms of which action a to apply next. Then, the simulator 220 advances the state of its environment to the next state s' and returns it, together with an intermediate reward r calculated using the tunable reward function, back to the autonomous agent engine 114. In a next step, the autonomous agent engine 114 uses the former state s', which now becomes current state s (e.g., the updated current state of the environment), and processes it through the artificial intelligence model 210, to get, again, the next action a to apply. After a bulk of this interactions are stored in terms of tuples of (s, a, r, s'), the artificial intelligence model 210 is updated on the supervision that r supplies for each of the state-action selections throughout the agent-simulator interactions.

More specifically, the simulator 220 takes a decision (action a) from the autonomous agent engine 114 (via the artificial intelligence model 210) and advances actors (e.g., the vehicles 201a, 201b) in the environment around the vehicle 100 (without advancing the vehicle 100). The simulator 220 then simulates advancement of the environment over time based on the action a, and the vehicle 100 is controlled (e.g., using the control engine 116) using the action a. The control inputs (e.g., an acceleration, a trajectory, etc.) are input back into the simulator 220, which generates a new state s' and sends it back to the logic 204 as shown by the arrow 221. By the time one iteration of the simulation is complete, s' becomes the current state s of the environment, then the logic 204 takes as input the new state s of the environment, coverts it to an input vector of numbers (e.g., the input 211), which is then input into the artificial intelligence model 210. The artificial intelligence model 210 outputs an output vector of numbers 215, which represents an index of a maximal score for a reward. The simulator 220 then maps the action to the trajectory. Now, the simulator 220 knows how to advance vehicle 100 over the next time step. A data set is generated by iterating this process between the logic 204, the artificial intelligence model 210, and the simulator 220. For each iteration, the following is generated: the current state s, the action taken a, the future state s', and an intermediate reward r. Once the dataset is built (which can be presented as tuples of (s, a, r, s')), the artificial intelligence model 210 can be improved based on the gathered data in order to maximize a total reward so that the artificial intelligence model 210 makes better decisions (e.g., maximizes r over time).

Figure 3:
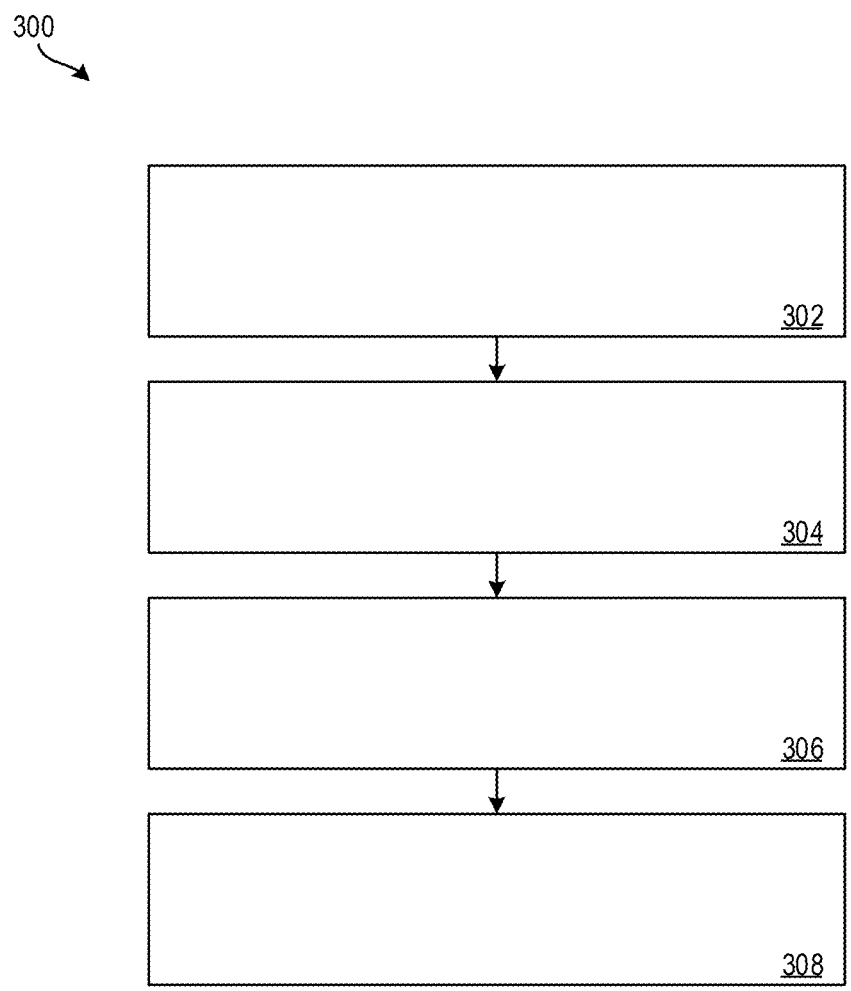
FIG. 3 depicts a flow diagram of a method for implementing a reward function for autonomous vehicle operation according to one or more embodiments described herein.

FIG. 3 depicts a flow diagram of a method 300 for implementing a reward function for autonomous vehicle operation according to one or more embodiments described herein. The method 300 can be performed by any suitable system or device such as the processing system 110 of FIG. 1, the remote processing system 150, the processing system 400 of FIG. 4, or any other suitable processing system and/or processing device (e.g., a processor). The method 300 is now described with reference to the elements of FIGS. 1 and/or 2 but is not so limited.

At block 302, the autonomous agent engine 114 of the processing system 110 receives a currents state of a vehicle. At block 304, the autonomous agent engine 114 of the processing system 110, using an output of an artificial intelligence model (e.g., the artificial intelligence model 210), predicts a future state of the vehicle 100 based at least in part on the current state of the vehicle 100. At block 306, the autonomous agent engine 114 of the processing system 110 calculates, using a tunable reward function, a reward associated with the future state of the vehicle 100. The tunable reward function includes multiple tunable coefficients as described herein. The tunable coefficients can be tuned to refine the reward based on efficiency, comfort, and task-completion, for example, as described herein.

At block 308, the artificial intelligence model is trained and/or updated based at least in part on the reward. That is, the associations between inputs (initial states and actions) and outputs (future states and rewards based on the initial states and actions) are learned and/or updated.

In some examples, the control engine 116 of the processing system 110 controls the vehicle 100 based at least in part on the artificial intelligence model. For example, the autonomous agent engine 114 makes a driving decision based at least in part on the artificial intelligence model 210 and some complementary preprogrammed logic that wraps it referred to as a "driving policy." The vehicle 100 is then controlled by implementing the driving policy. For example, the driving policy can provide commands to the vehicle 100 to cause the vehicle to accelerate, decelerate, steer, etc. to implement an action to achieve a goal. The action can be selected from one of multiple actions. This improves vehicle operation by providing a safe, comfortable, and efficient ride for an occupant of the vehicle 100. This causes the vehicle 100 to operate more efficiently, with better ride experience for its occupants, and in a safer way.

The reward function described herein can be used in different types of artificial intelligence, such as reinforcement learning, online search, and the like. In some embodiments, such as during reinforcement learning, the reward function is used during an offline training process. In other embodiments, such as during online search, the reward function is used directly online during a real-time (or near real-time) inference.

Additional processes also may be included, and it should be understood that the process depicted in FIG. 3 represents an illustration and that other processes may be added or existing processes may be removed, modified, or rearranged without departing from the scope and spirit of the present disclosure.

Figure 4:
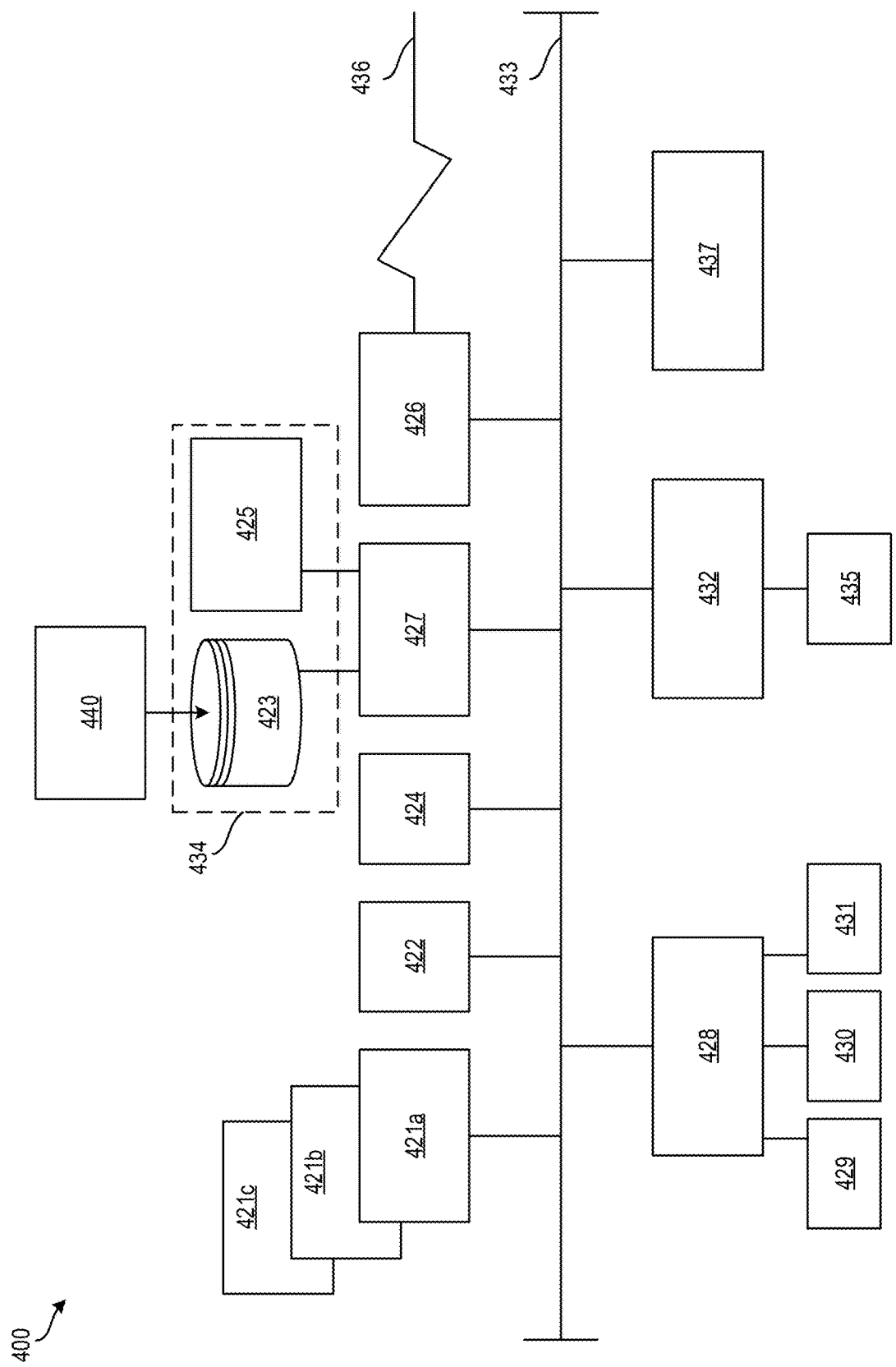
FIG. 4 depicts a block diagram of a processing system for implementing the techniques described herein according to an exemplary embodiment.

It is understood that the present disclosure is capable of being implemented in conjunction with any type of computing environment now known or later developed. For example, FIG. 4 depicts a block diagram of a processing system 400 for implementing the techniques described herein. In examples, processing system 400 has one or more central processing units (processors) 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 427 and a network adapter 426 coupled to system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to system bus 433 by display adapter 432, which may include a graphics adapter to improve the performance of graphics intensive applications and a video controller. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 (or other suitable input and/or output, such as a touch screen of an infotainment system) may be interconnected to system bus 433 via user interface adapter 428, which may include, for example, a Super I/O chip integrating multiple device adapters into a single integrated circuit. One or more of the cameras 120-123, 130-133 are also connected to the system bus 433.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in processing system 400.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method comprising:
   receiving, by a processing device, a current state of a vehicle;
   predicting, by the processing device using an output of an artificial intelligence model, a future state of the vehicle based at least in part on the current state of the vehicle;
   calculating, by the processing device using a tunable reward function, a reward associated with the future state of the vehicle, the tunable reward function comprising multiple tunable coefficients;
   training, by the processing device, the artificial intelligence model based at least in part on the reward; and
   autonomously controlling the vehicle based at least in part on the artificial intelligence model,
   wherein the tunable reward function rewards for both a full success and a partial success, wherein a partial success includes handing off control of the vehicle to a user based on a determination that the autonomous control of the vehicle is likely to fail to achieve the full success, and
   wherein the tunable reward function is expressed as:

$$R(s, a, s') = +1 - C_{speed}\left[\frac{|v_h - v_{desired}|}{v_{desired}}\right]^{C_{temp}} - C_{Jerk}\int J^2(t) + \frac{1}{1-\gamma} \cdot [I_{success}(s') + C_{handoff} \cdot I_{handoff}(s')],$$

where $C_{speed}$ is a tunable coefficient of velocity; $v_h$ is an actual velocity of the vehicle; $v_{desired}$ is a desired driving velocity of the vehicle; $C_{temp}$ is a tunable coefficient of a decay of a velocity of the vehicle from the desired driving velocity; $C_{Jerk}$ is a tunable coefficient of a magnitude of jerk; $J^2$ is a squared amount of jerk; $\gamma$ is a tunable discount factor; I is an indicator function; and $C_{handoff}$ is a tunable coefficient of magnitude of success for a handoff.

2. The computer-implemented method of claim 1, wherein one of the multiple tunable coefficients is a tunable coefficient of a magnitude of jerk caused by a change in a velocity of the vehicle.

3. The computer-implemented method of claim 1, wherein the tunable reward function accounts for a current reward versus a future reward.

4. The computer-implemented method of claim 1, wherein the tunable reward function rewards for efficiency.

5. The computer-implemented method of claim 1, wherein the tunable reward function rewards for comfort.

6. The computer-implemented method of claim 1, wherein the tunable reward function considers a tradeoff between efficiency and comfort.

7. The computer-implemented method of claim 1, wherein the tunable reward function is a function of the current state s of the vehicle, an action a, and the future state s' of the vehicle.

8. The computer-implemented method of claim 1, wherein the tunable reward function supports driver-in-the-loop functionality.

9. A system comprising:
   a memory comprising computer readable instructions; and
   a processing device for executing the computer readable instructions, the computer readable instructions controlling the processing device to perform operations comprising:
   receiving a current state of a vehicle;
   predicting, using an output of an artificial intelligence model, a future state of the vehicle based at least in part on the current state of the vehicle;
   calculating, using a tunable reward function, a reward associated with the future state of the vehicle, the tunable reward function comprising multiple tunable coefficients;
   training the artificial intelligence model based at least in part on the reward; and
   autonomously controlling the vehicle based at least in part on the artificial intelligence model,
   wherein the tunable reward function rewards for both a full success and a partial success, wherein a partial success includes handing off control of the vehicle to a user based on a determination that the autonomous control of the vehicle is likely to fail to achieve the full success,
   wherein the tunable reward function is expressed as:

$$R(s, a, s') = +1 - C_{speed}\left[\frac{|v_h - v_{desired}|}{v_{desired}}\right]^{C_{temp}} - C_{Jerk}\int J^2(t) + \frac{1}{1-\gamma} \cdot [I_{success}(s') + C_{handoff} \cdot I_{handoff}(s')],$$

where $C_{speed}$ is a tunable coefficient of velocity; $v_h$ is an actual velocity of the vehicle; $v_{desired}$ is a desired driving velocity of the vehicle; $C_{temp}$ is a tunable coefficient of a decay of a velocity of the vehicle from the desired driving velocity; $C_{jerk}$ is a tunable coefficient of a magnitude of jerk; $J^2$ is a squared amount of jerk; $\gamma$ is a tunable discount factor; I is an indicator function; and $C_{handoff}$ is a tunable coefficient of magnitude of success for a handoff.

10. The system of claim 9, wherein the tunable reward function is a function of the current state s of the vehicle, an action a, and the future state s' of the vehicle.

11. A computer program product comprising a non-transitory computer readable storage medium having program instructions embodied therewith, the program instructions executable by a processor to cause the processor to perform operations comprising:
   receiving a current state of a vehicle;
   predicting, using an output of an artificial intelligence model, a future state of the vehicle based at least in part on the current state of the vehicle;
   calculating, using a tunable reward function, a reward associated with the future state of the vehicle, the tunable reward function comprising multiple tunable coefficients;
   training the artificial intelligence model based at least in part on the reward; and
   autonomously controlling the vehicle based at least in part on the artificial intelligence model,
   wherein the tunable reward function rewards for both a full success and a partial success, wherein a partial success includes handing off control of the vehicle to a user based on a determination that the autonomous control of the vehicle is likely to fail to achieve the full success, and wherein the tunable reward function is expressed as:

$$R(s, a, s') = +1 - C_{speed}\left[\frac{|v_h - v_{desired}|}{v_{desired}}\right]^{C_{temp}} - C_{Jerk}\int J^2(t) + \frac{1}{1-\gamma} \cdot [I_{success}(s') + C_{handoff} \cdot I_{handoff}(s')],$$

where $C_{speed}$ is a tunable coefficient of velocity; $v_h$ is an actual velocity of the vehicle; $v_{desired}$ is a desired driving velocity of the vehicle; $C_{temp}$ is a tunable coefficient of a decay of a velocity of the vehicle from the desired driving velocity; $C_{jerk}$ is a tunable coefficient of a magnitude of jerk; $J^2$ is a squared amount of jerk; $\gamma$ is a tunable discount factor; I is an indicator function; and $C_{handoff}$ is a tunable coefficient of magnitude of success for a handoff.

* * * * *